UNITED STATES PATENT OFFICE.

HENRY J. LIVINGSTON, OF NEW ORLEANS, LOUISIANA.

COMPOSITION OF MATTER FOR PRODUCING PORTLAND CEMENT.

SPECIFICATION forming part of Letters Patent No. 486,165, dated November 15, 1892.

Application filed April 11, 1891. Serial No. 388,941. (No specimens.)

*To all whom it may concern:*

Be it known that I, HENRY JAMES LIVINGSTON, a citizen of Great Britain, residing at New Orleans, in the parish of Orleans and State of Louisiana, have invented certain new and useful Improvements in a Composition of Matter for the Production of Portland Cement; and I do declare the following to be a full, clear, and exact description of the invention, such as will enable others skilled in the art to which it appertains to make and use the same.

My composition consists of the following ingredients, combined in substantially the proportions stated, viz: shells or any limestone containing ninety per cent. and upward of carbonate of lime, eleven parts; alluvial or other clay, two parts; ground-chalk flints, one part.

In preparing the above-noted composition I take an even and unvarying class of flints, commonly known as "chalk flints," because they are extracted clear and pure in a body from chalk-beds, calcine them directly from the said beds, and with the other ingredients are ground together in any suitable manner, so as to produce a fine powder, then mixing this powder with sufficient water to congeal the same into lumps, burning the lumps in a kiln, and finally grinding them into powder for use.

By the use of the above composition the trouble, uncertainty, and expense of obtaining suitable clay and limestone for the raw material of Portland cement are entirely avoided.

I am aware that small quantities of sand, quartz-rock, and furnace-slag have been used in the manufacture of Portland cement, and I therefore lay no claim thereto; but What I do claim, and desire to secure by Letters Patent, is—

The herein-described composition of matter for the production of Portland cement, consisting of shell containing ninety per cent. and upward of carbonate of lime, alluvial clay, and ground-chalk flints in substantially the proportions specified.

H. J. LIVINGSTON.

Witnesses:
 NORMAN STEEL,
 GEO. P. BUDDENDORFF.